US006853397B2

(12) United States Patent
Onishi

(10) Patent No.: US 6,853,397 B2
(45) Date of Patent: Feb. 8, 2005

(54) IMAGE FORMING DEVICE

(75) Inventor: Takeshi Onishi, Kanagawa (JP)

(73) Assignee: Fuji Xerox, Co., Ltd., Tokyo (JP)

(*) Notice: Subject to any disclaimer, the term of this patent is extended or adjusted under 35 U.S.C. 154(b) by 39 days.

(21) Appl. No.: 10/459,554

(22) Filed: Jun. 12, 2003

(65) Prior Publication Data

US 2004/0056946 A1 Mar. 25, 2004

(30) Foreign Application Priority Data

Sep. 19, 2002 (JP) ....................................... 2002-273274

(51) Int. Cl.[7] ................................................ G02B 26/10
(52) U.S. Cl. ....................................... 347/241; 347/243
(58) Field of Search ................................. 347/232, 233, 347/241, 243, 256, 261; 359/204, 216

(56) References Cited

U.S. PATENT DOCUMENTS 6,100,912 A * 8/2000 Shiraishi et al. ............ 347/233
6,101,019 A * 8/2000 Kunugi ........................ 359/204
2002/0051054 A1 * 5/2002 Shiraishi et al. ............ 347/241

FOREIGN PATENT DOCUMENTS

| | | |
|---|---|---|
| JP | 59-123368 | 7/1984 |
| JP | 63-271275 | 11/1988 |
| JP | 9-184991 | 7/1997 |
| JP | 2001-215423 | 8/2001 |

* cited by examiner

*Primary Examiner*—Huan Tran
(74) *Attorney, Agent, or Firm*—Morgan, Lewis & Bockius, LLP

(57) ABSTRACT

In a disclosed image forming device, the directions of light sources at installation and the numbers of returning mirror are set such that a plurality of optical beams emitted from multi-beam lasers in which light-emitting sections are two-dimensionally arranged have the same directions for the two dimensional axes on each of corresponding photosensitive bodies. Each of a main scanning direction and a sub-scanning direction on the photosensitive bodies has the same direction as each direction of the main scanning axis (for example, the X axis) and the sub scanning axis (for example, the Y axis) of each optical beams.

16 Claims, 11 Drawing Sheets

IMAGE FORMING DEVICE

CROSS-REFERENCE TO RELATED APPLICATION

This application claims priority under 35 USC 119 from Japanese Patent Application No. 2002-273274, the disclosure of which is incorporated by reference herein.

BACKGROUND OF THE INVENTION

1. Field of the Invention

The present invention relates to an image forming device according to an electro-photographic method by which a plurality of images formed on photosensitive bodies by a plurality of optical beams are overlapped and output as a single image. More particularly, the invention relates to an image forming device such as a laser-beam color printer and a digital color copying machine. In these machines, the photosensitive bodies are scanned with optical beams emitted from each light-emitting sections and exposed to the beams by lighting each of the light-emitting sections in a multi-beam laser, based on image information.

2. Description of the Related Art

Recently, a multi-colored image forming device such as a laser-beam color printer has been demanded to achieve higher speed and better image quality by lower cost than previous models.

A tandem method has been known as a method for increasing the speed of the image forming device. According to the method, photosensitive bodies which are individually installed for each color are scanned with optical beams to form images for each color and a plurality of images are overlapped on a transferring medium to form a color image.

Conventionally, for example, a device has been disclosed in the Japanese Patent Application Laid-Open (JP-A) No. 63-271275 as this kind of a multi-colored image forming device.

As disclosed in the above application, four photosensitive bodies are arranged corresponding to four colors of yellow (Y), magenta (M), cyan (C), and black (K) to form a four-colored image. Optical scanners for optical-beam scanning are provided for each photosensitive body. In this method, a high speed image forming device is realized by simultaneous operations of image forming for each of four colors and the four optical scanners have the same configuration.

In this method, fine adjustment of optical components such as mirrors provided in each optical scanner or the optical scanners themselves is executed to correct deviations between positions of optical beams for each of four colors to be overlapped.

A device is disclosed in the JP-A No. 59-123368 is one example in which optical beams enters different reflecting surfaces of one rotating polygonal mirror in order to reduce the number of components.

In this method, each of the plurality of optical beams is configured to enter onto different reflecting surfaces of the rotating polygonal mirror. Optical beams after reflection and deflection by the rotating polygonal mirror are reflected and deflected in different directions to the mirror respectively.

The optical beams reflected and deflected in different directions at the rotating polygonal mirror have a different direction as a main scanning direction on the photosensitive body from each other.

In this method, fine adjustment of optical components such as mirrors provided in each optical scanner causes fine adjustment of positions of optical beams to which the photosensitive body is exposed. Accordingly, deviations between positions of optical beams for four colors to be overlapped are corrected.

A device disclosed in the JP-A No. 9-184991 is one example in which a plurality of optical beams enter onto one rotating polygonal mirror. Components for optical scanning systems are commonly used.

In this method, the optical beams enter the same reflecting surface of the mirror. Optical beams reflected and deflected by the rotating polygonal mirror are reflected and deflected in the same direction to the rotating polygonal mirror respectively.

All the optical beams reflected and deflected in the same direction by the rotating polygonal mirror have the same direction as the main scanning direction on the photosensitive body.

In this method, fine adjustment of optical components such as mirrors provided in each optical scanner causes fine adjustment of positions of optical beams to which the photosensitive body is exposed. Accordingly, deviations between positions of optical beams for four colors to be overlapped are corrected.

A method in which a surface emitting laser with a plurality of light-emitting sections arranged in two dimensions is used as a light source has been known as a method by which a high image quality image forming device is obtained.

A device disclosed in the JP-A No. 2001-215423 is one example in which a surface melting laser with light-emitting sections arranged in two dimensions is used as a light source. One surface emitting laser is provided with 36 light-emitting sections.

A high-density optical writing with a density of 2400 dpi can be realized by scanning and exposing the photosensitive body with 36 optical beams emitted from the surface emitting laser at the same time.

In a device disclosed in the JP-A No. 2001-215423, timing for lighting each of the light-emitting sections in the main scanning direction is controlled. This leads to that amounts of the following offset are corrected at image forming, since in surface emitting lasers, a plurality of light-emitting sections are arranged offset in the main scanning direction.

A starting position for writing an image in the main scanning direction is controlled by provision of a synchronization optical sensor outside an image area. Deviation of a starting position for writing an image which deviation is caused by an exposed image with two dimensional broadening is prevented by using only one row of the light-emitting sections (6 sections) to be lit on the surface emitting laser. The row of the sections is arranged in the sub-scanning direction among 36 light-emitting sections.

As described above, in optical systems using the surface emitting laser with the light-emitting sections which are arranged in two dimensions, a plurality of optical beams emitted from the surface emitting laser have two axes in two directions. Assuming that the optical axis is a normal life, the plurality of optical beams are arranged in two dimensions on a plane defined with the two axes.

Let us assume that the X axis is a main scanning direction and the Y axis is a sub-scanning direction. In FIG. 4, for example, where 36 light-emitting sections are aligned and arranged in the sub-scanning direction by 6 sections, the 36 light-emitting sections have six coordinates on the X axis and have 36 coordinates on the Y axis.

In the optical systems which use multi-beam lasers with such a plurality of light-emitting sections arranged in two dimensions, the direction of either axis of two axes is reversed, depending on returning directions, when there is in the optical systems a mirror which returns optical beams.

That is, when there is an optical system mirrors 100 and 102, which return optical beams in the main scanning direction, as shown in FIG. 8, the direction of the optical beams in the X direction is reversed before and after passing (reflecting at) the mirrors 100 and 102.

When mirrors 104 and 106 are in an optical system, which return optical beams in the sub-scanning direction, as shown in FIG. 9, the direction of the optical beams in the Y direction is reversed before and after passing (reflecting at) the mirrors 104 and 106.

A method by which the tandem configuration and the two-dimensional multi-beam laser such as the surface emitting laser are applied in a multi-colored image forming device as described above is effective for a high speed and high image quality multi-colored image forming device. However, there have been the following problems when the configuration and the laser are installed at the same time.

When the two-dimensional multi-beam laser is used in the light-emitting section, and when the optical systems corresponding to a plurality of colors in the multi-colored image forming device are different from each other, arrangements of a plurality of optical beams on the photosensitive bodies become different for each color in some cases.

when the beam arrangements on the photosensitive bodies become different from each other, the following problems occur.

In the first place, a case in which beam arrangements in the main scanning direction are different from each other will be explained.

In the two-dimensional multi-beam laser, offset in the main scanning direction at light-emitting sections are controlled to be canceled and, then, starting positions for writing images in the main scanning directions have the same position.

When the starting positions for writing are different from each other for each color, offset control is required for different positions and leads to increase the production cost.

In order to control the starting positions for writing images, optical beams for synchronization detection which are lit on synchronization sensors are also different from each other. Accordingly, control means are required for different beams to increase the production cost.

When the directions of the sub-scanning directions are different from each other on photosensitive bodies, to reverse the direction of image data to a sub-scanning direction beforehand, which is input to a multi-beam laser, is required for aligning the directions of images in the sub-scanning directions. Accordingly, another means for reversing image data is required to increase the production cost.

FIG. 10 shows one example in which two-dimensional multi-beam lasers are applied to an optical system on an image forming device according to the JP-A No. 59-123368. Two light sources 108 and 110, and returning optical mirrors 112 and 114, corresponding to the light sources 108 and 110, in the optical system are extracted for explanation.

Two axes of two-dimensional optical beams emitted from the light sources 108 and 110 have the same direction. A reference numeral 115 indicates a rotating polygonal mirror.

With regard to the directions of the two-dimensional optical beams on photosensitive bodies 116 and 118 to be exposed respectively to the optical beam, the X axes (axes in the main scanning direction) both correspond to the main scanning directions of optical systems (the axial directions of the photosensitive body 116 and 118). The sub-scanning directions are opposite to each other regarding the rotation directions of the photosensitive bodies 116 and 118.

Thus, in order to align the directions of the images which are made on the photosensitive bodies 116 and 118 by the optical system in FIG. 10 after exposing, the direction of an image signal to be input to either of the light sources 108 or 110 must be reversed to the sub-scanning direction.

Reversing images additionally requires changing a control board of a surface emitting laser or an image control board. This means that the number of different parts will increase and the number of common parts will decrease. As a result, the production cost will increase.

When a common signal is used as an image signal, that is, a common board for image control systems is tried, two kinds of surface emitting lasers are required. One kind of the laser is that having directions of the two axes shown in FIG. 10 and, another kind is that only the Y axis (the axis in the sub-scanning direction) is reversed for surface emitting lasers as the light sources 108 and 110. As a result, a common light source is unpractical and higher cost would be required in any way.

The two-dimensional multi-beam laser is applied to an optical system in an image forming device as disclosed in the JP-A No. 9-184991. Light sources 120 and 122, and returning mirrors 123, 124 and 126 in the optical system, through which optical beams from the light sources 120 and 122 pass, are extracted from the disclosure for explanation.

In FIG. 11, two mirrors after a rotating polygonal mirror are omitted from the image forming device disclosed in the JP-A No. 9-184991. Images are reversed and returned to the original ones with two mirrors which optical beams reflect in the same direction. This is substantially the same as that shown is no mirror. Accordingly, the two mirrors are omitted in the drawing. A reference numeral 127 is a rotating polygonal mirror.

As shown in FIG. 11, the direction of two axes of two-dimensional optical beams emitted from the light sources 120 and 122 are the same.

The two axial directions of photosensitive body drums 128 and 130 to be exposed to the individual optical beams are opposite to each other regarding the main scanning direction of the optical beams (the axial directions of the photosensitive body drums 128 and 130).

Thus, in order to align the orientations of images exposed to the photosensitive body drums 128 and 130 by the optical system in FIG. 11, reversing an image signal, which is for inputting to either of the light source 120 or 122, will be necessary to the main scanning direction at a proper time.

Modification of a control board of a surface emitting laser or an image control band will be necessary in order to reverse the image signal at the proper time. This means that the number of different parts will increase and the number of common parts will decrease. As a result, the production cost will increase.

When a common signal is used as an image signal, that is, common image control boards are tried to be employed, two kinds of surface emitting lasers corresponding to light sources 120 and 122 will be needed. One kind is the one having two axial directions shown in FIG. 11. Another is that only the X axis (the axis in the sub-scanning direction) is reversed. This means that the number of different parts will increase and the number of common parts will decrease. As a result, the production cost will increase.

In a method, by which optical scanners for optical-beam scanning are installed for each photosensitive body, as disclosed in the JP-A No. 63-271275, the directions of the two axes of the two-dimensional optical beams become the same on four photosensitive bodies when four optical scanners have the same configuration. In this case, the above-described problems will not arise.

There are some conditions where optical scanners need to be modified due to inner layout of an image forming device, and black images are high-speed output for increasing output productivity of monochrome images. When the system disclosed in JP-A No. 63-271275 is under these conditions, problems similar to the above-described problems were observed.

SUMMARY OF THE INVENTION

The present invention has been made, considering the above-described circumstances, and one of its objects is to provide an image forming device at low cost without a complex image control method, as intricate method which controls starting positions for writing images, and the like by using a two-dimensional multi-beam laser as a light source.

A first aspect of the invention provides an image forming device in which a plurality of multi-beam lasers in which a plurality of light-emitting sections are arranged in two dimensions are arranged; a plurality of photosensitive bodies are arranged corresponding to the multi-beam lasers; latent images are formed on each photosensitive body by scanning a plurality of optical beams emitted from the plurality of multi-beam lasers for exposing the plurality of photosensitive bodies, using optical scanning systems comprising mirrors which return the plurality of optical beams; and a plurality of images formed on each photosensitive body after developing the latent images are overlapped and are output as a single image. The optical scanning systems comprise the one or more returning mirrors every the multi-beam laser. Directions of the multi-beam lasers and the number of the returning mirrors for each multi-beam laser are set so that each of the photosensitive bodies has the same arrangement, in the main scanning direction and the sub-scanning direction, of a plurality of optical beams emitted from the multi-beam lasers, on the photosensitive bodies.

Then, the operations of the image forming device according to the invention will be briefly explained.

In the image forming device according to the invention, for example, the directions of light sources at installation and the numbers of returning mirrors are set so that a plurality of optical beams emitted from multi-beam lasers in which light-emitting sections are arranged in two dimensions have the same directions for the two dimensional axes on each of corresponding photosensitive bodies.

That is, each of the main scanning direction and the sub-scanning direction on the photosensitive bodies is configured to have the same direction as each direction of the main scanning axis (for example, the X axis) and the sub scanning axis (for example, the Y axis) of each optical beams.

For example, when only the X-axis direction is the same and the Y-axis direction is not the same, the photosensitive bodies can have the same two-dimensional directions, since the direction of the Y-axis is reversed by increasing the number of the returning mirrors in the sub-scanning direction by one.

When the Y-axis direction is the same and only the X-axis direction is not the same, only the X-axis direction can be reversed, by increasing the number of the returning mirrors in the main scanning direction by one at an optical path from a deflection device to a light-emitting source of the optical beam. The two-dimensional direction on the photosensitive bodies can have the same directions among the photosensitive bodies.

Moreover, when both the X-axis and Y-axis directions are reversed, the two-dimensional directions on the photosensitive bodies have the same directions by installing the multi-beam lasers as a light source so that the lasers are rotated by 180° about the optical axis.

As described above, the two-dimensional directions on the photosensitive bodies can have the same directions by an image forming device with the configuration according to the invention. Control of image signals with the same configuration can be realized by a plurality of multi-beam lasers. Accordingly, control circuits are not required to be changed depending on the lighting sources and a high speed, high image quality and low-cost image forming device can be provided.

In the image forming device according to the invention, the following configuration may be applied. The optical scanning systems comprises a rotating polygonal mirror by which deflection and scanning of the optical beams are executed. The plurality of multi-beam lasers which emit optical beams to be deflected in one direction from an boundary which is assumed to be a virtual line passing through the axis of rotation of the rotating polygonal mirror in the diametral direction are provided. Difference in the number of the returning mirrors between the multi-beam lasers is set to an even number.

Subsequently, the operations of the image forming device in which the above configuration is executed will be explained.

In the image forming device with the above configuration, a plurality of optical beams emitted from a plurality of multi-beam lasers are deflected in one direction are deflected in one direction from an boundary which is assumed to be a virtual line passing through the axis of rotation of the rotating polygonal mirror in the diametral direction.

Here, since the difference in the number of returning mirrors between the multi-beam lasers is set to be an even number, all the directions of a plurality of optical beams on each photosensitive body become the same only by setting the directions, using the multi-beam lasers with the same configuration. Therefore, common use of a multi-beam laser can be realized.

In the image forming device according to the invention, the following configuration may be applied. The optical scanning systems comprise the returning mirrors which return the optical beams in the main scanning direction and the returning mirrors which return the optical beams in the sub-scanning direction. Each of the multi-beam lasers is arranged so that the laser is directed in the same direction about the optical axis when both difference in the number of the returning mirrors which return the optical beams in the main scanning direction between the multi-beam lasers and difference in the number of the returning mirrors which return the optical beams in the sub-scanning direction between the multi-beam lasers are an even number. One of the multi-beam lasers is arranged so that the laser is rotated by approximately 180° to the other laser about the optical axis when both difference in the number of the returning mirrors which return the optical beams in the sub-scanning direction between the multi-beam lasers and difference in the number of the returning mirrors which return the optical beams in the main scanning direction between the multi-beam lasers are an odd number.

Then, the operations of the image forming device in this case will be explained.

A plurality of optical beams emitted from the multi-beam lasers are returned in the main scanning direction by a returning mirror which returns beams in the main scanning direction and are returned in the sub-scanning direction by a returning mirror which returns beams in the sub-scanning direction.

Here, when both difference in the number of returning mirrors which return optical beams in the main scanning direction between the multi-beam lasers and difference in the number of returning mirrors which return optical beams in the sub-scanning direction between the multi-beam lasers are an even number, all the directions of a plurality of optical beams on each photosensitive body become the same by arrangement of each multi-beam laser so that the lasers are directed in the same directions about the optical axis.

When both difference in the number of returning mirrors which return optical beams in the sub-scanning direction between the multi-beam lasers and difference in the number of returning mirrors which return optical beams in the main scanning direction between the multi-beam lasers are an odd number, the directions of a plurality of optical beams on the photosensitive bodies become opposite to each other among the multi-beam lasers by arrangement of each multi-beam laser so that the lasers are directed in the same directions about the optical axis.

Thereby, all the directions of a plurality of optical beams on each photosensitive body become the same by arrangement of each multi-beam laser so that one of laser is rotated by approximately 180° about the axis of rotation to the other multi-beam laser.

In the image forming device according to the invention, the following configuration may be applied. The optical scanning systems comprise a rotating polygonal mirror which deflects the optical beam for scanning. A multi-beam laser which emits optical beams to be deflected in one direction from an boundary which is assumed to be a virtual line passing through the axis of rotation of the rotating polygonal mirror in the diametral direction and a multi-beam laser which emits optical beams to be deflected in the other direction from the boundary which is assumed to be the virtual line are provided. Difference between the number of the returning mirrors which return the optical beams to one direction from the boundary which is assumed to be the virtual line and the number of the returning mirrors which return the optical beams to the other direction from the boundary which is assumed to be the virtual line is set to be an odd number.

Then, the operations of the image forming device in this case will be explained.

A multi-beam laser which emits optical beams to be deflected in one direction from an boundary which is assumed to be a virtual line passing through the axis of rotation of the rotating polygonal mirror in the diametral direction and a multi-beam laser which emits optical beams to be deflected in the other direction from the boundary which is assumed to be the virtual line are provided. Thereby, there are a plurality of optical beams which are deflected in one direction from an boundary which is assumed to be a virtual line and a plurality of optical beams which are deflected in the other direction.

Here, difference between the number of the returning mirrors which return optical beams to one direction from the boundary which is assumed to be the virtual line and the number of the returning mirrors which return optical beams to the other direction from the boundary which is assumed to be the virtual line is set to be an odd number. Thereby, all the directions of a plurality of optical beams on each photosensitive body become the same only by setting the directions, using the multi-beam lasers with the same configuration. Therefore, common use of a multi-beam laser can be realized.

In the image forming device according to the invention, the following configuration may be further applied. The optical scanning systems comprise returning mirrors which return the optical beam in the main scanning direction and returning mirrors which return the optical beam in the sub-scanning direction. Each of the multi-beam lasers is arranged so that the laser is directed in the same direction about the optical axis when difference in the number of the returning mirrors which return the optical beams in the main scanning direction between the multi-beam lasers is an even number, and difference in the number of the returning mirrors which return the optical beams in the sub-scanning direction between the multi-beam lasers in an odd number. One of the multi-beam lasers is arranged so that the laser is rotated by approximately 180° to the other laser about the optical axis when difference in the number of the returning mirrors which return the optical beams in the main scanning direction between the multi-beam lasers is an odd number, and when difference in the number of the returning mirrors which return the optical beams in the sub-scanning direction between the multi-beam lasers in an even number.

Then, the operations of the image forming device in this case will be explained.

A plurality of optical beams emitted from the multi-beam lasers are returned in the main scanning direction by a returning mirror which returns beams in the main scanning direction. The plurality of optical beams are returned in the subs-canning direction by a returning mirror which returns beams in the sub-scanning direction.

Here, each of the multi-beam lasers is arranged so that the laser is directed in the same direction about the optical axis when difference in the number of the returning mirrors which return the optical beams in the main scanning direction between the multi-beam lasers is an even number, and difference in the number of the returning mirrors which return the optical beams in the sub-scanning direction between the multi-beam lasers is an odd number. Accordingly, all the directions of a plurality of optical beams on each photosensitive body become the same.

One of the multi-beam lasers is arranged so that the laser is rotated by approximately 180° to the other laser about the optical axis when difference in the number of the returning mirrors which return the optical beams in the main scanning direction between the multi-beam lasers is an odd number, and when difference in the number of the returning mirrors which return the optical beams in the sub-scanning direction between the multi-beam lasers is an even number. Then, all the directions of a plurality of optical beams on each photosensitive body become the same.

DETAILED DESCRIPTION OF THE INVENTION

[First Embodiment]

Hereinafter, an image forming device 10 according to a first embodiment of the present invention will be explained, referring to drawings.

General Configuration of Image Forming Device

Figure 1:
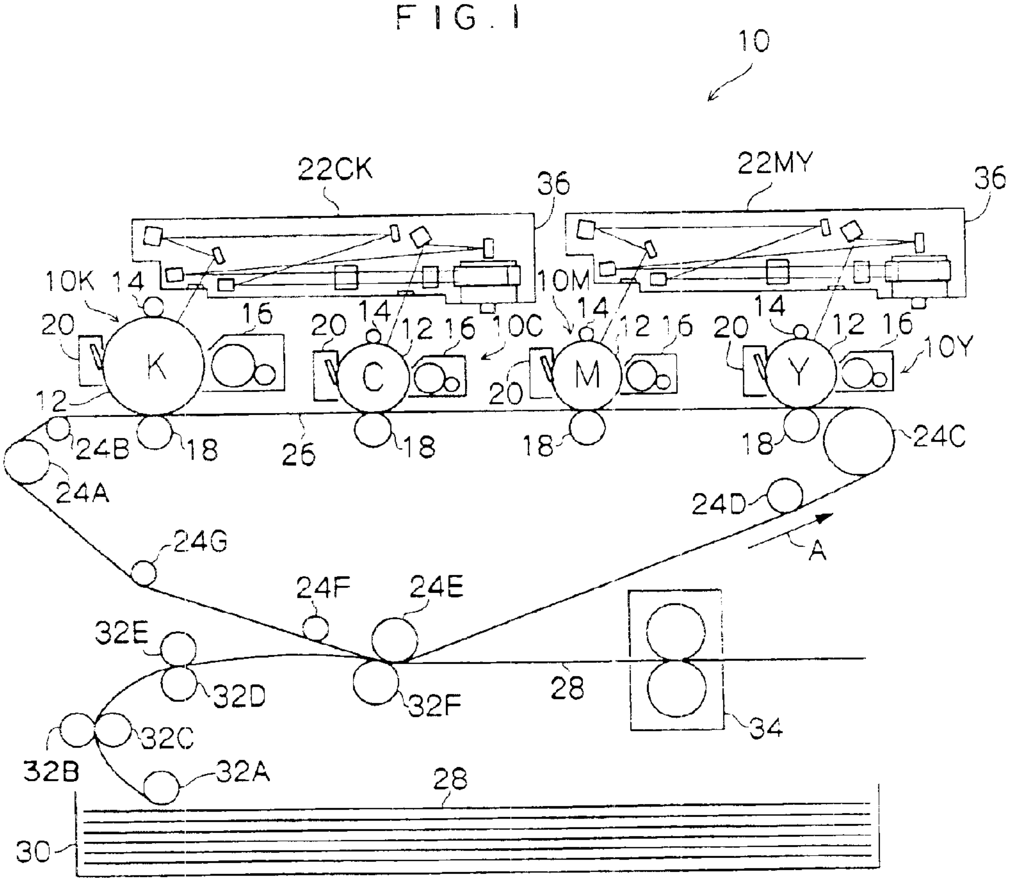
FIG. 1 is a side view of a principal part of an image forming device according to a first embodiment.

As shown in FIG. 1, the image forming device 10 according to the embodiment has an electro-photographs unit 10K which forms a black image, another electro-photographic unit 10C which forms a cyan image, a further another electro-photographic unit 10M which forms a magenta image and a still another electro-photographic unit 10Y which forms a yellow image.

Each of the electro-photographic units 10K, 10C, 10M and 10Y has a photosensitive body drum 12, an electrification device 14, a development device 16, a transferring device 18, and a cleaning device 20 respectively.

The photosensitive body drum 12 of the electro-photographic unit 10K which forms a black image has a larger diameter than those of the photosensitive body drum 12 of the other electro-photographic units 10C, 10M, and 10Y. This is to prevent the photosensitive body drum 12 only of the electro-photographic unit 10K from ending its life cycle quicker than other parts. Outputting a monochrome image shortens the life cycle.

The electro-photographic units 10K, 10C, 10M and 10Y are horizontally arranged. An optical scanner 22CK for black and cyan is arranged above the electro-photographic units 10K and 10C and an optical scanner 22MY for magenta and yellow is arranged above the electro-photographic units 10M and 10Y.

A belt-shaped intermediate transferring element 26 supported by rolls 24A through 24G is arranged under the electro-photographic units 10K, 10C, 10M and 10Y.

The intermediate transferring element 26 is driven in the direction of an arrow A shown in FIG. 1 by the rolls 24A through 24G.

The intermediate transferring element 26 is configured to be held between the photosensitive body drums 12 and rolls of the transferring devices 18. A toner image on the photosensitive body drum 12 is transferred onto the intermediate transferring element 26.

A paper tray 30 for stacking a plurality of sheet of paper 28 is arranged below the intermediate transferring element 26. Rolls 32A through 32F for conveying a sheet of paper 28 are arranged above the paper tray 30.

The sheet of paper 28 is conveyed one by one by the rolls 32A through 32F. The sheet of paper 28 comes into contact with the intermediate transferring element 26 between the roll 32F and the roll 24E. An image on the intermediate transferring element 26 is transferred onto the sheet 28.

The sheet of paper 28 onto which the image has been transferred is carried outside the device through a fixing device 34.

Details of Optical Scanning Device

An optical scanner 22YM and the optical scanner 22CK will be explained in detail.

Figure 2:
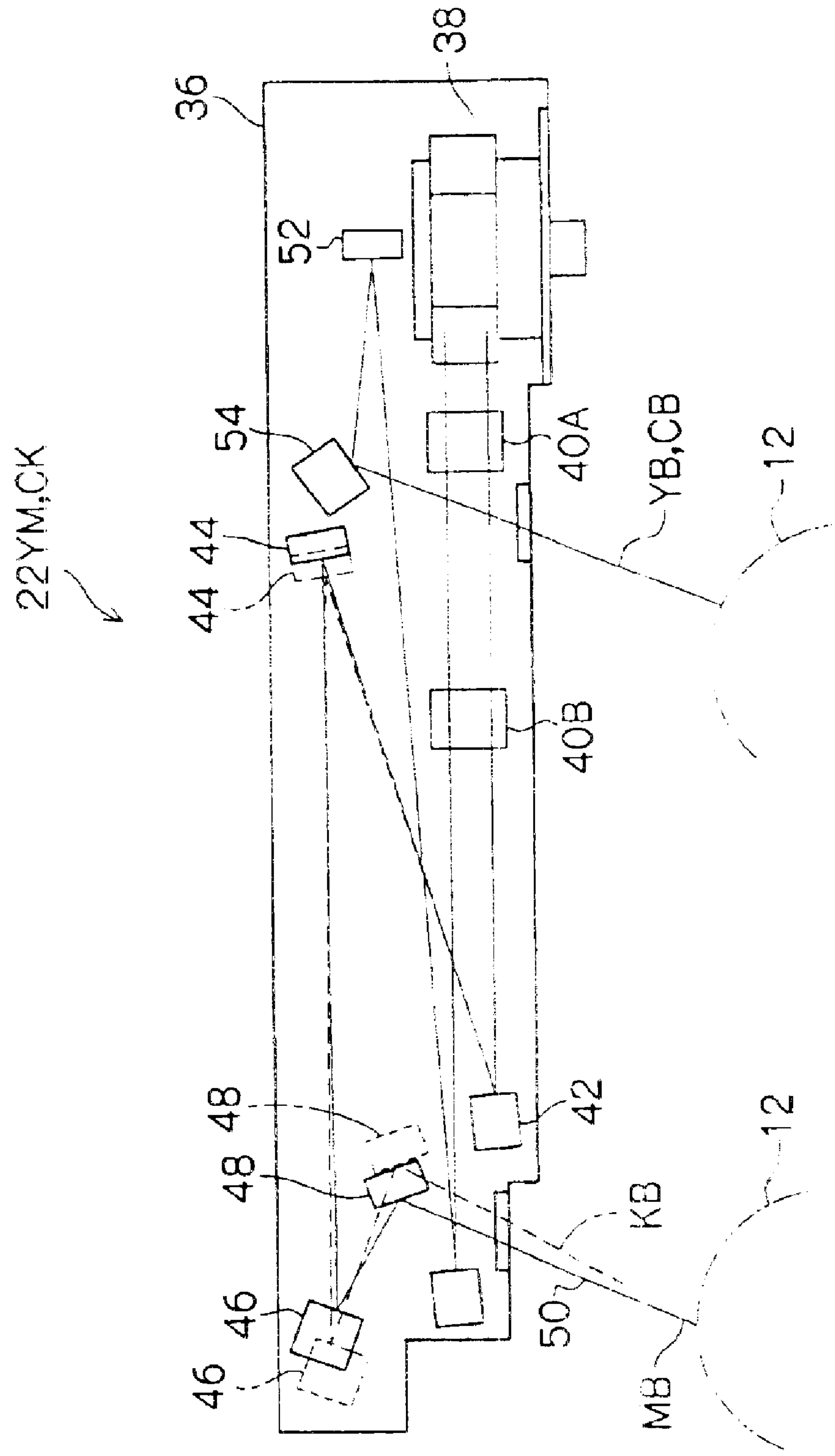
FIG. 2 is a side view of an optical scanner in the image forming device according to the first embodiment.

In FIG. 2, the optical scanners 22YM and 22CK are shown in a state that the both devices are overlapped. In FIG. 2, solid lines indicate situations for the optical scanner 22YM and dotted lines indicate those for the optical scanner 22CK.

Each of the optical scanners 22YM and 22CMK is provided with a case 36.

A rotating polygonal mirror 38, a set of two fθ lenses 40A and 40B, a returning mirror 42, a returning mirror 44, a cylindrical mirror 46 with a refractive index in a sub-scanning direction, a returning mirror 48, a returning mirror 50, a returning mirror 52, and a cylindrical mirror 54 are provided in the case 36.

Luminous fluxes from two light sources to the two photosensitive body drums 12 are reflected and deflected at one rotating polygonal mirror 38. Those two light sources whose details will be later described are not shown in FIG. 2. The luminous fluxes are focused, using a set of two fθ lenses 40A and 40B, in a main scanning direction in order to let the luminous fluxes scan the photosensitive body drum 12 at a constant velocity.

When explanation is made referring to magenta (M) and black (K) optical paths, the luminous fluxes which have passed through the fθ lenses 40A and B are returned by the returning mirrors 42 and 44. The luminous fluxes are focused in the sub scanning direction on the photosensitive body drum 12 through the cylindrical mirror 46 and the reflecting mirror 48.

The cylindrical mirror 46 also functions as a face-tangle-error correction optical system for the rotating polygonal mirror 38.

With regard to yellow and cyan optical paths, the luminous fluxes reach the photosensitive body drums 12 through the returning mirrors 50 and 52, and the cylindrical mirror 54.

Since two optical systems contained in one case 36 use one set of the fθ lenses 40A and 40B in common, the both optical systems have the same optical path length from the rotating polygonal mirror 38 to the photosensitive body drum 12.

Moreover, since the optical scanners 22CK and 22YM use the set of fθ lenses 40A and 40B with the same configuration together, all the optical paths for yellow, magenta, cyan and black have the same length in the both cases 36.

The length of the optical path for black is required inside the case 36 to be longer than that for magenta because the distance from the case 36 to the photosensitive body drum 12 for black is shorter than that for magenta.

Thereby, the positions of the returning mirrors 44 and 48, and the cylindrical mirror 46 are individually and gradually changed for each of black and magenta in order to eliminate the difference in the length of the optical paths as shown in FIG. 2.

Figure 3:
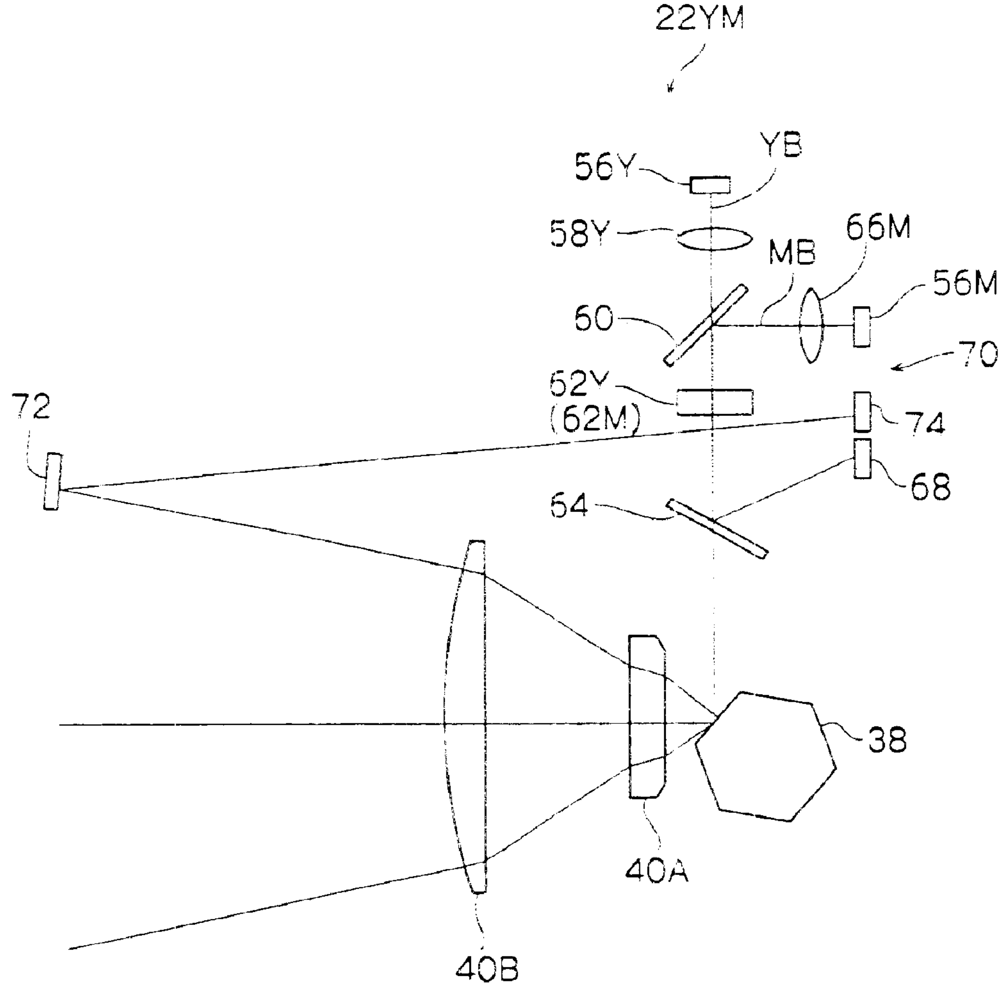
FIG. 3 is a plan view of a principal part of the optical scanner.
Figure 4A:
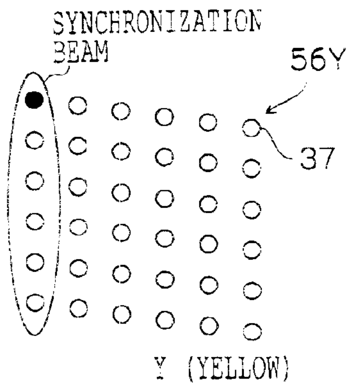
FIGS. 4A though 4D are front views of a light source, respectively.
Figure 4B:
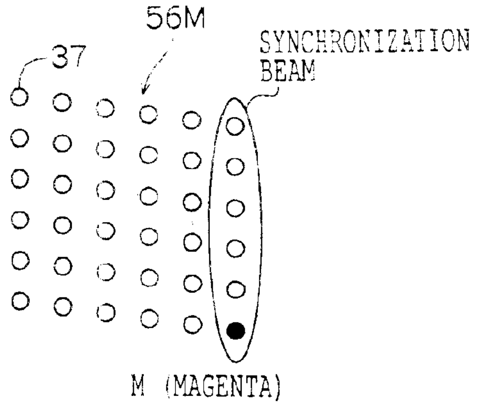
Figure 4C:
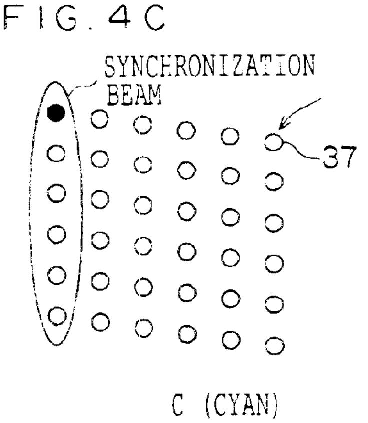
Figure 4D:
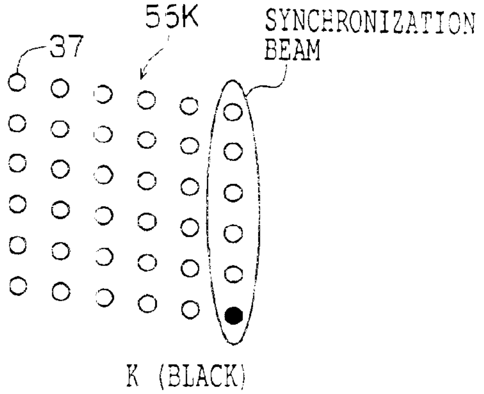

FIG. 3 is a plan view of the optical system in the optical scanner 22YM viewing from the top. In FIG. 3, only the optical system between the fθ lenses 40A and 40B and the light source is shown and other parts are eliminated.

The optical scanner 22YM is provided with a light source 56Y for yellow and a light source 56M for magenta. Each of the light source 56Y and 56M in a surface emitting laser array for emitting optical beams.

According to the present embodiment, the light sources 56Y and 56M and the light sources 56C and 56K of the optical scanner 22CK are the surface emitting laser arrays of the same structure. As shown in FIGS. 4A through 4D, 36 light-emitting sections 37 are provided in those light sources in order to emit 36 optical beams.

A collimating lens 58Y, a reflecting mirror 60, a cylindrical lens 62Y, a cylindrical lens 62M, a half mirror 64, and a rotating polygonal mirror 38 are arranged in order at the optical-beam emitting side of the light source 56Y. The reflecting mirror 60 reflects optical beams emitted from the lighting source 56M. The half mirror 64 reflects a part of optical beams.

As seen from FIGS. 1 and 2, optical beams for yellow and optical beams for magenta enter the rotating polygonal mirror 38 at different heights respectively. The location of the optical beams for yellow is higher than that of the optical beams for magenta.

The mirror 60 is arranged below an optical path of optical beams emitted from the light sources 56Y for yellow. Accordingly, the reflecting mirror 60 for reflecting optical beams emitted from the light source 56M reflects only optical beams for magenta. This is to cause a state where an optical path of the optical beams for magenta and an optical path of the optical beams for yellow overlap as viewed from the top.

A collimating lens 66M and the light source 56M are arranged in the direction perpendicular to the direction from the reflecting mirror 60 to the light source 56Y.

A plurality of optical beams emitted from the light source 56Y are made to approximately parallel light by means of the collimating lens 58Y and a plurality of optical beams emitted from the light source 56M are made to approximately parallel light by means of the collimating lens 66M.

As described above, the optical path of the optical beams for yellow and that of the optical beams for magenta have different height from each other. The level of the optical path of the optical beams for yellow is higher than that of the optical path of the optical beams for magenta at least until reaching the fθ lenses 40A and 40B.

The cylindrical lens 62M is arranged below the cylindrical lens 62Y. The cylindrical lens 62Y and the cylindrical lens 62M appear to overlap as viewed from the top, as shown in FIG. 3.

The cylindrical lens 62Y focuses collimated optical beams for yellow only in the sub-scanning direction. The cylindrical lens 62M focuses collimated optical beams for magenta only in the sub-scanning direction.

The half mirror 64 separates and reflects a part of optical beams to a sensor 68 for light quantity detection. Unlike an end-face emitting laser, the surface emitting laser has no back beams. Detecting the light quality using front beams is needed.

The optical beams YB for yellow which have passed through the half mirror 64 are reflected and deflected by means of the rotating polygonal mirror 38. As shown in FIG. 2, the optical beams YB reach the photosensitive body drum 12 through the fθ lenses 40A and 40B, the returning mirror 50, the returning mirror 52, and the cylindrical mirror 54.

The optical beams MB for magenta which have passed through the half mirror 64 are reflected and deflected by means of the rotating polygonal mirror 38. As shown in FIG. 2, the optical beams MB reach the photosensitive body drum 12 through the fθ lenses 40A and 40B, the returning mirror 42, the returning mirror 44, the cylindrical mirror 46, and the returning mirror 48.

As shown in FIG. 3, a beam-passing-timing detector 70 is provided in the optical scanner 22YM. The beam-passing-timing detector 70 detects timing of beam passing before starting scanning of the photosensitive body drum in order to adjust timing of exposure of the photosensitive body drum 12, using each reflecting surface of the rotating polygonal mirror 38.

The beam-passing-timing detector 70 has a pickup mirror 72 and a synchronization optical sensor 74. The pickup mirror 72 reflects optical beams (see FIGS. 4A through 4D: Six beams per one line) for synchronization before scanning the photosensitive body. The optical beams for synchronization reflected at the pickup mirror 72 enter the synchronization optical sensor 74.

The optical scanner 22CK has the same configuration as that of the optical scanner 22YM. Explaining the optical scanner 22CK will be omitted.

In the present embodiment, the numbers of returning mirrors in each optical system are set as shown in Table 1. The reflecting surfaces of the rotating polygonal mirror 38 are counted as a returning mirror because optical beams are returned in the main scanning direction at the surfaces.

TABLE 1

| Optical system | Number of returning mirrors in the main scanning direction | Number of returning mirrors in the sub-scanning direction | Total number |
|---|---|---|---|
| Y: yellow | 1 | 3 | 4 |
| M: magenta | 2 | 4 | 6 |
| C: cyan | 1 | 3 | 4 |
| K: black | 2 | 4 | 6 |

That is, in the present embodiment, the optical systems for yellow and cyan have four returning mirrors respectively. Among them, one of the returning mirrors in the main scanning direction is the reflecting surface of the rotating polygonal mirror 38 and three of the returning mirrors in the sub-scanning direction are the returning mirrors 50, 52, and the cylindrical mirror 54.

The optical systems for magenta and black have six returning mirrors respectively. Among them, two of the returning mirrors in the main scanning direction are the reflecting surface of the rotating polygonal mirror 38 and the reflecting mirror 60, and four of the returning mirrors in the sub-scanning direction are the returning mirrors 42, 44 and 48, and the cylindrical mirror 46.

FIGS. 4A through 4D are views of the light sources for each of optical beams for yellow, magenta, cyan, and black as viewed from the rotating polygonal mirror 38. The vertical direction in FIGS. 4A through 4D matches that of the axis of rotation of the rotating polygonal mirror 38. Specified light-emitting sections among the light-emitting sections 37 shown in FIGS. 4A through 4D are indicated by black spots for understanding of the directions of every multi-beam laser.

In the present embodiment, difference in the number of the returning mirrors in the main scanning direction is one or an odd number. In the sub-scanning direction, difference in the number of the returning mirrors between the optical system for yellow and that for magenta is one or an odd number. Difference in the number of the returning mirrors in the main scanning direction is one (an odd number), and difference in the number of the returning mirrors in the sub-scanning direction between the optical system for black and that for cyan is one (an odd number).

Accordingly, in the present embodiment, the light source for magenta 56M and that for black 56K are installed as shown in FIGS. 4A through 4D in a state such that the sources for 56M and 56K are rotated by 180° to those for yellow 56Y and for cyan 56C.

Figure 5A:
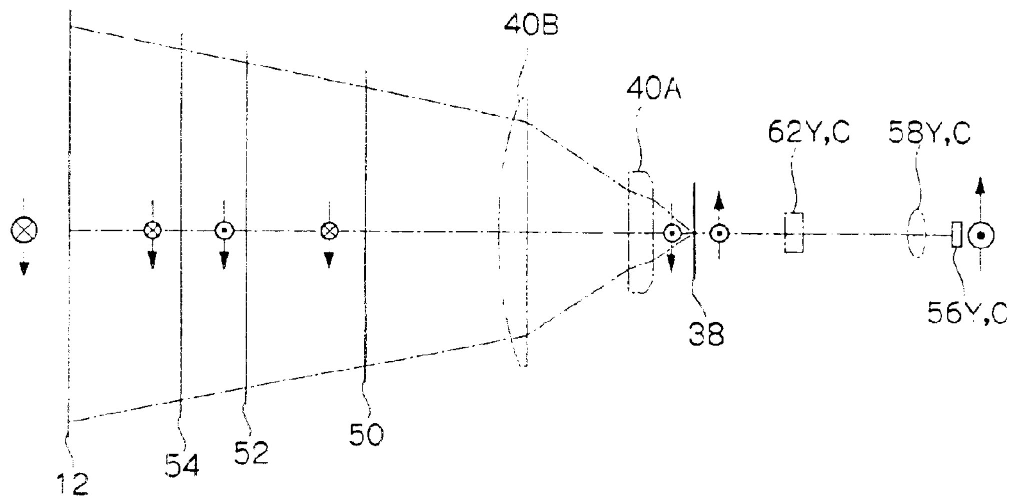
FIG. 5A is an explanatory view showing changes in the axial direction of optical beams by returning mirrors in optical systems for yellow and cyan.
Figure 5B:
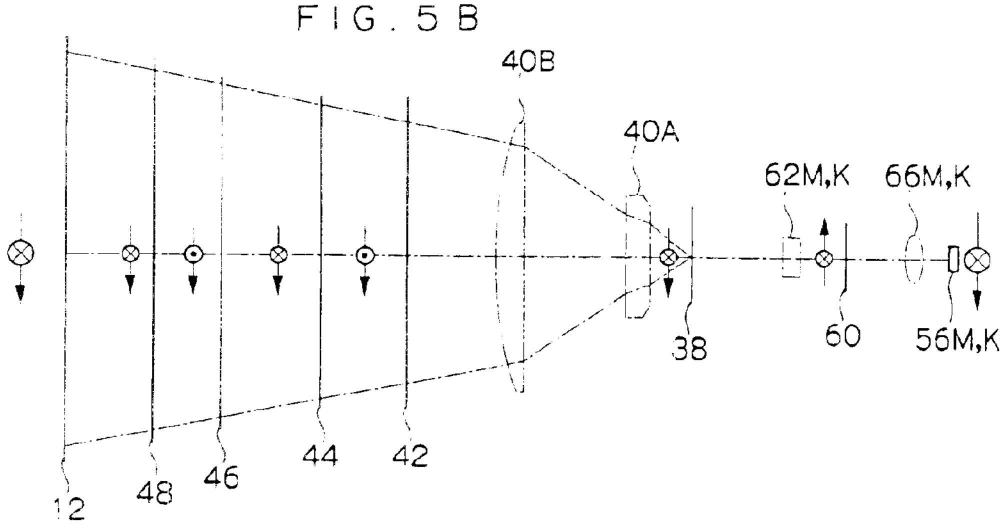
FIG. 5B is an explanatory view showing changes in the axial direction of optical beams by returning mirrors in optical systems for black and magenta.

FIGS. 5A and 5B show axial changes of a plurality of optical beams (two-dimensional beams) by the returning mirrors according to the present embodiment.

The light source for magenta 56M and that for black 56K are installed in such a state that the sources for 56M and 56K are rotated by 180° to those for yellow 56Y and for cyan 56C, respectively. The axial directions of the main scanning and those in the sub-scanning direction of the optical systems for yellow and cyan are opposite those of the optical systems for magenta and black at the positions of the light sources.

Operation

The operation of the image forming device 10 according to the present embodiment will be explained.

When optical beams are reflected at the returning mirrors in the main scanning direction, the axis in the main scanning direction is reversed. When optical beams are reflected at the returning mirrors in the sub-scanning direction, the axis in the sub-scanning direction is reversed.

In the present embodiment, the light source for magenta 56M and that for black 56K are installed in such a state that the sources for 56M and 56K are rotated by 180° to those for yellow 56Y and for cyan 56C, respectively. Difference in the number of the returning mirrors in the main scanning direction is one (an odd number) and that in the sub-scanning direction is one (an odd number) between the optical system for yellow and the optical system for magenta. Difference in the number of the returning mirrors in the main scanning direction is one (an odd number) and that in the sub-scanning direction is one (an odd number) between the optical system for black and the optical system for cyan, as shown in FIGS. 4A through 4D. Accordingly, all arrangements of each optical beam (directions of two dimensional beams) and the same on each of the photosensitive body drums 12 for yellow, magenta, cyan and black.

Thereby, control of image signals with the same configuration can be realized and control circuits are not required to be changed depending on the lighting sources (colors) in the light sources 56Y, 56C, 56M and 56K. The high speed, high image quality and low-cost image forming device 10 can be provided.

[Second Embodiment]

An image forming device 80 according to a second embodiment of the invention will be explained, referring to FIGS. 6A and 6B, and 7A through 7D. Common parts with the first embodiment have the same reference numerals, and explanation of the parts will be omitted.

In the first embodiment, two optical scanners of an optical scanner 22CK for black and cyan and that of 22MY for magenta and yellow are installed. Instead, a single optical scanner 22CMY for emitting optical beams of the colors of yellow, magenta, cyan, and black is provided in the image forming device 80 according to the second embodiment.

In the second embodiment, all photosensitive body drums 12 corresponding to respective color are set to have the same diameter.

Figure 6A:
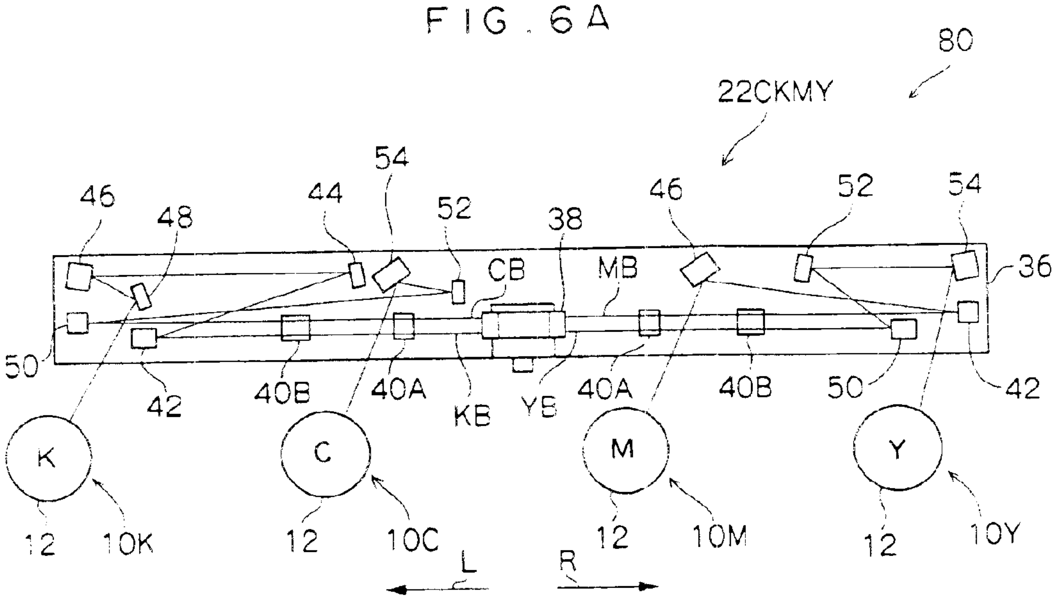
FIG. 6A is a side view of a principal part of an image forming device according to a second embodiment.

FIG. 6A shows only the photosensitive body drums 12 in electro-photographic units 10K, 10C, 10M and 10Y respectively. An electrification device 14, a development device 16, a transferring device 18, a cleaning device 20 and the like are omitted from FIG. 6A.

The optical scanner 22CKMY of the second embodiment has approximately similar optical components to those of the first embodiment. The arrangements and the numbers of the optical components are different from those of the first embodiment.

In the second embodiment, one rotating polygonal mirror 38 is arranged at the center of a case 36. Optical systems for black and cyan are arranged on the left side (in the direction of the arrow L) of the rotating polygonal mirror 38. Optical systems for yellow and magenta are arranged on the right side (in the direction of the arrow R) of the rotating polygonal mirror 38.

In the second embodiment, the optical path of optical beams YB for yellow and that of optical beams MB for magenta have different height. The level of the optical path of the optical beams YB for yellow is lower than that of the optical path of the optical beams MB for magenta at least until reaching fθ lenses 40A and 40B.

The optical path of optical beams KB for black and that of optical beams CB for cyan have different height. The level of the optical path of the optical beams KB for black is lower than that of the optical path of the optical beams CB for cyan at least until reaching the fθ lenses 40A and 40B.

Figure 6B:
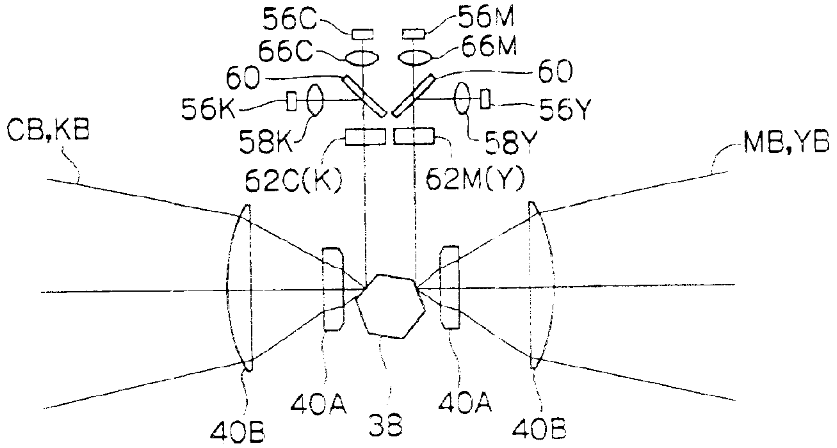
FIG. 6B is a plan view of a principal part of an optical scanner.
Figure 7A:
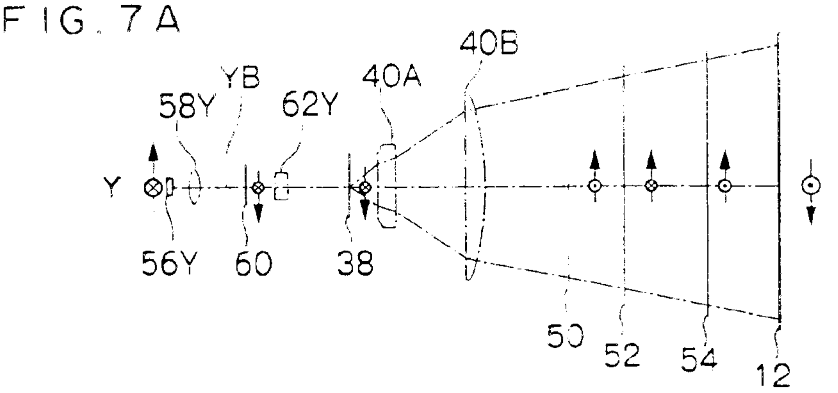
FIG. 7A is an explanatory view showing changes in the axial direction of optical beams by returning mirrors in an optical system for yellow.
Figure 7B:
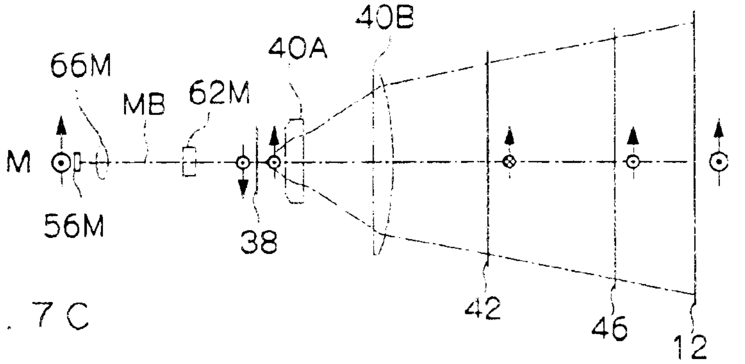
FIG. 7B is an explanatory view showing changes in the axial direction of optical beams by returning mirrors in an optical system for magenta.
Figure 7C:
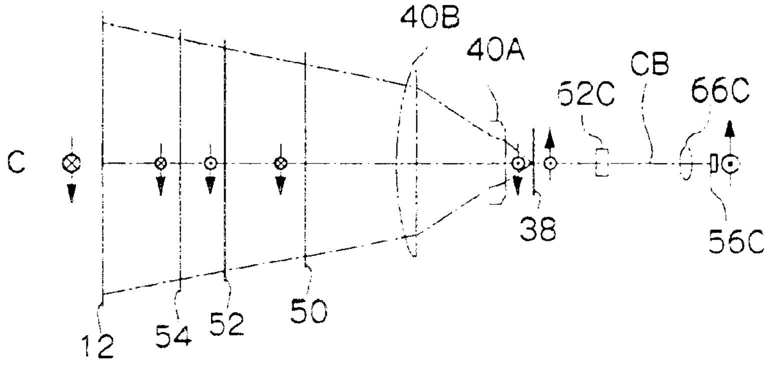
FIG. 7C is an explanatory view showing changes in the axial direction of optical beams by returning mirrors in an optical system for cyan.
Figure 7D:
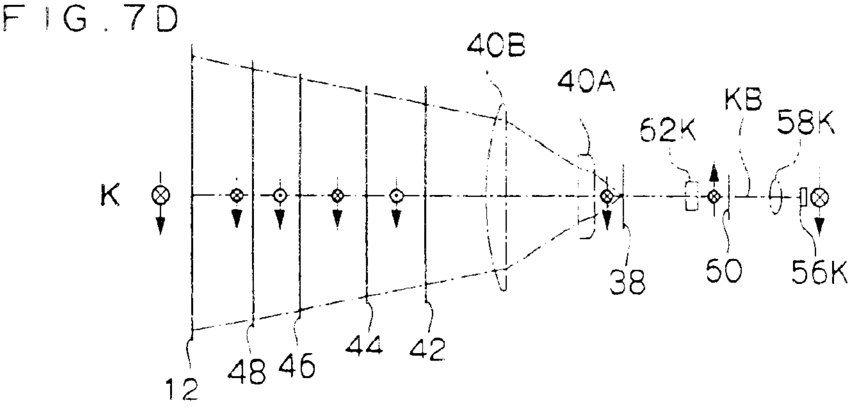
FIG. 7D is an explanatory view showing changes in the axial direction of optical beams by returning mirrors in an optical system for black.
Figure 8:
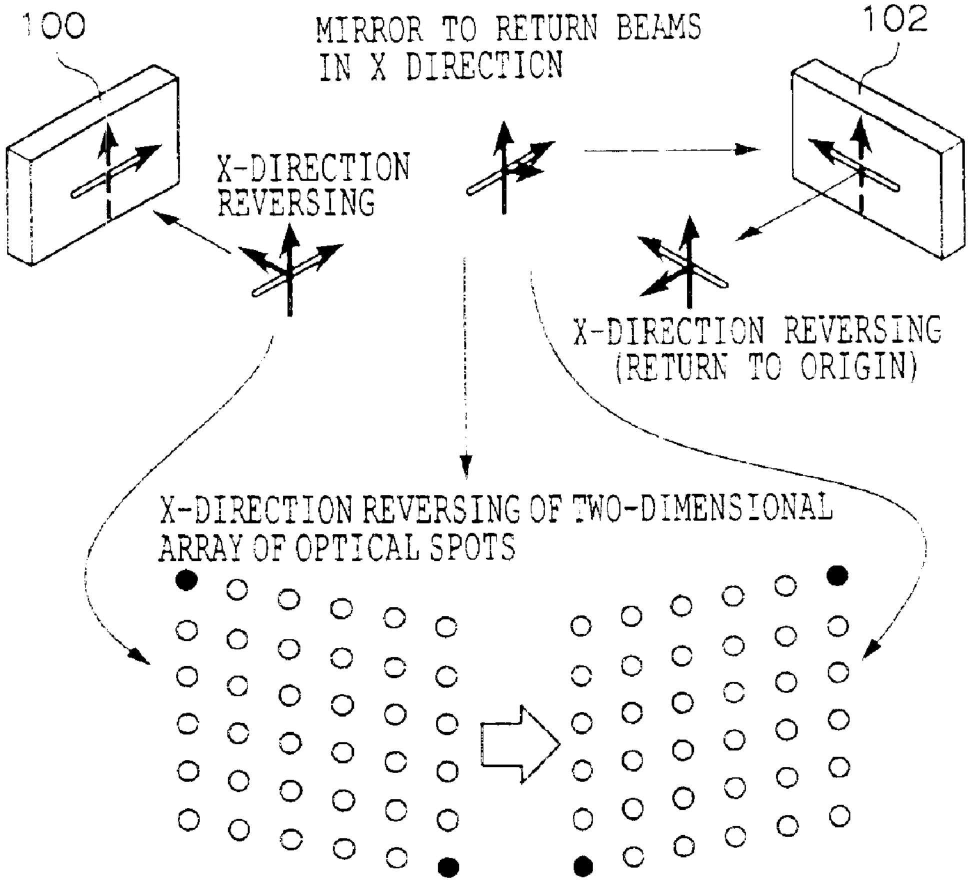
FIG. 8 PRIOR ART
FIG. 8 is an explanatory view explaining directions of optical beams in an optical system provided with mirrors which return optical beams in a main scanning direction (the X direction).
Figure 9:
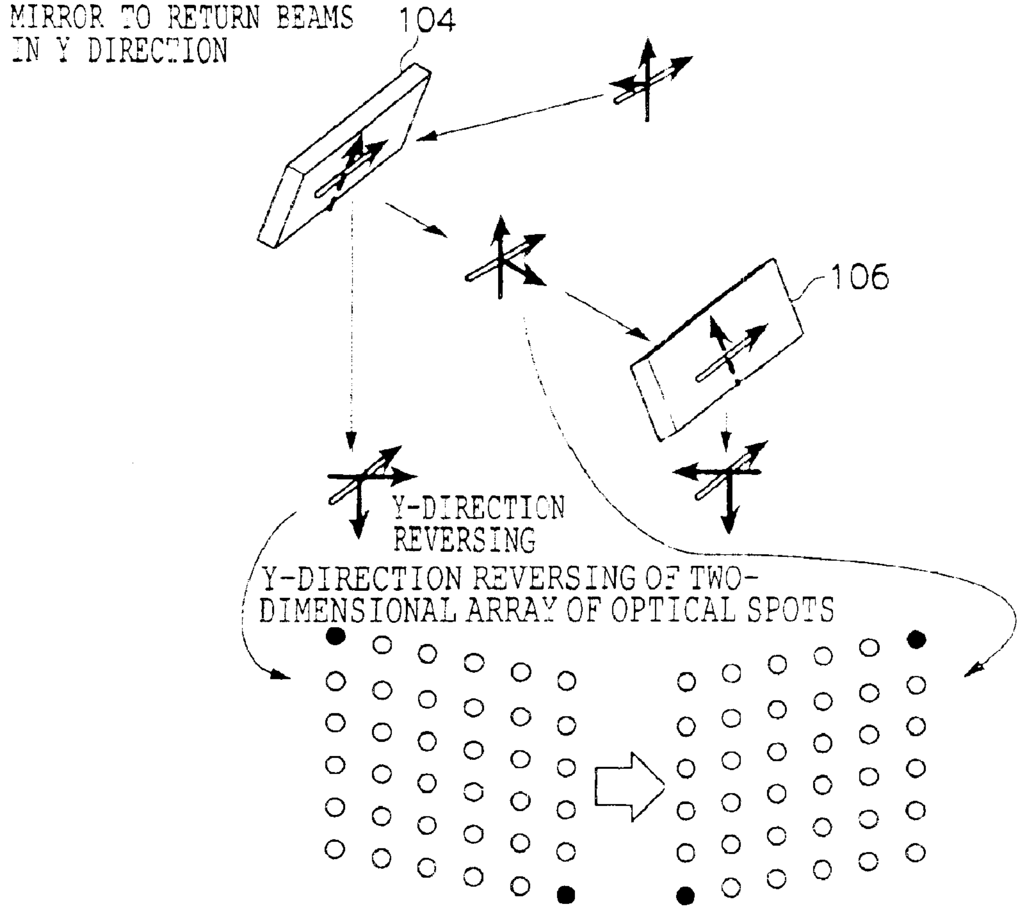
FIG. 9 PRIOR ART
FIG. 9 is an explanatory view explaining directions of optical beams in an optical system provided with mirrors which return optical beams in a sub-scanning direction (the Y direction).
Figure 10:
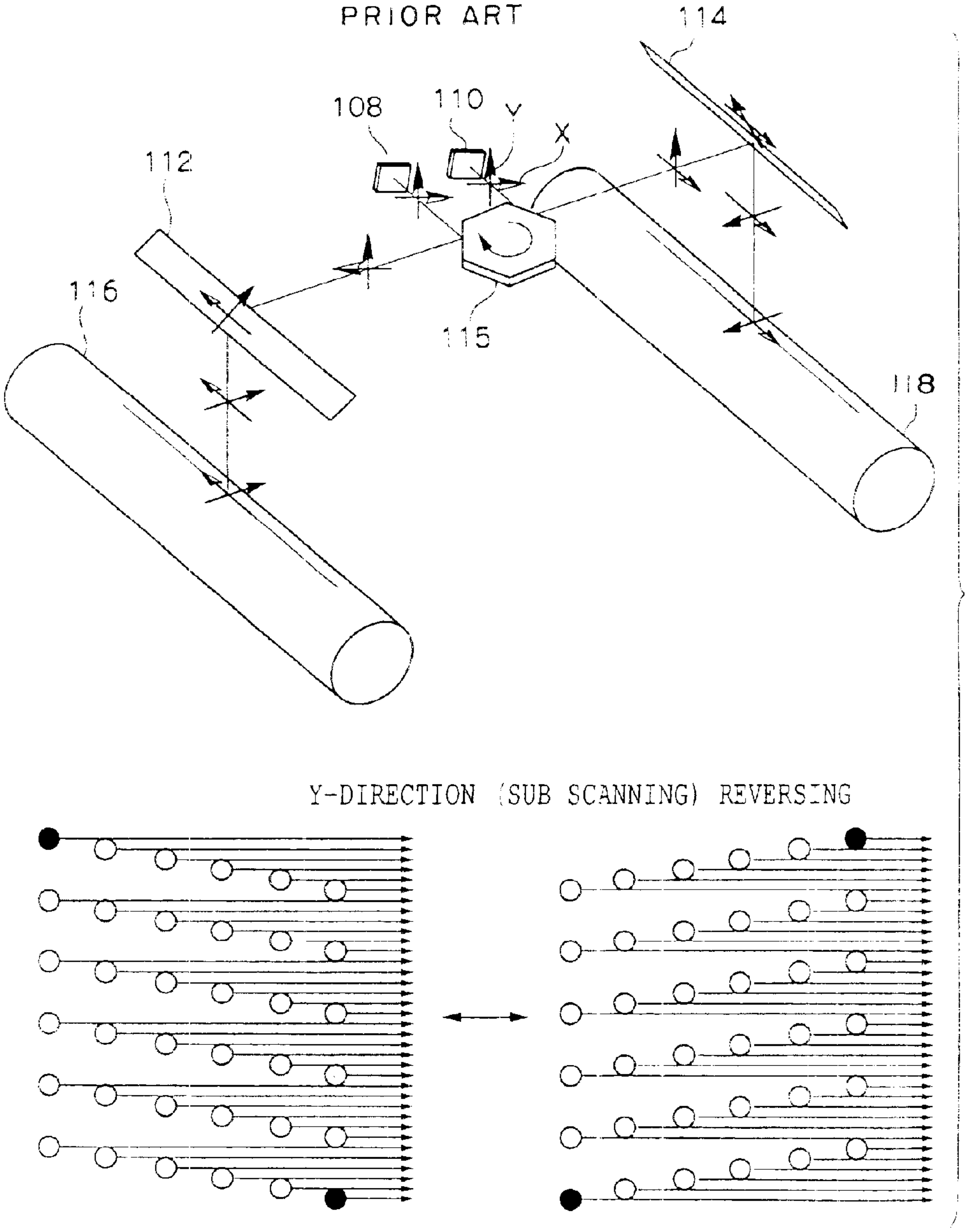
FIG. 10 PRIOR ART
FIG. 10 is an explanatory view showing one example in which two-dimensional multi-beam lasers are applied to an optical system in an image forming device according to a related art.
Figure 11:
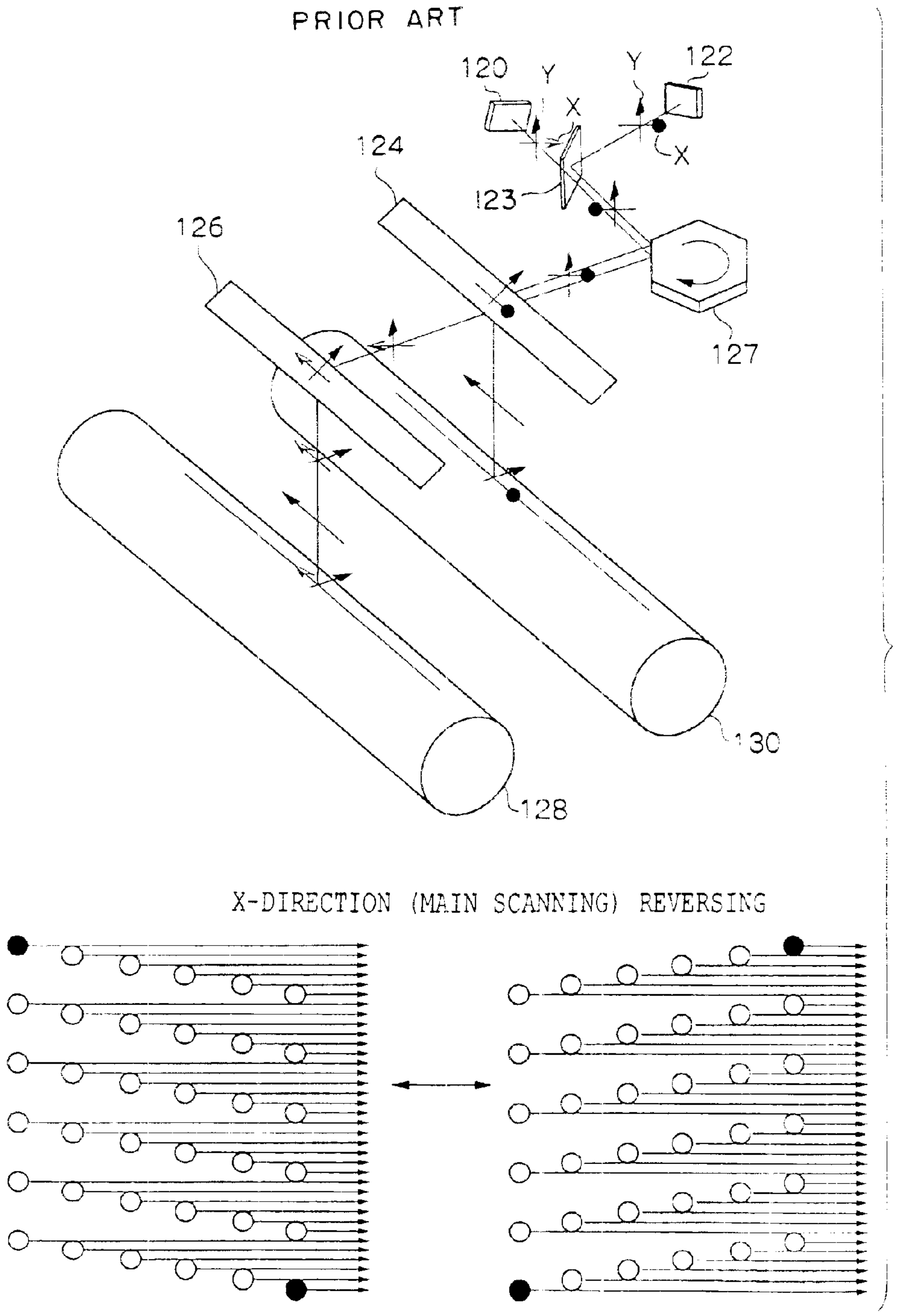
FIG. 11 PRIOR ART
FIG. 11 is an explanatory view showing one example in which two-dimensional multi-beam lasers are applied to an optical system in another image forming device according to a related art.

The optical systems for black and cyan, and the optical systems for yellow and magenta are symmetrical with respect to the rotating polygonal mirror 38 in the optical system from the light source to the fθ lenses 40A and 40B, as shown in FIG. 6B.

In the second embodiment, the numbers of returning mirrors in each optical system are set as shown in Table 2.

TABLE 2

| Optical system | Number of returning mirrors in the main scanning direction | Number of returning mirrors in the sub-scanning direction | Total number |
|---|---|---|---|
| Y: yellow | 2 | 3 | 5 |
| M: magenta | 1 | 2 | 3 |
| C: cyan | 1 | 3 | 4 |
| K: black | 2 | 4 | 6 |

That is, in the second embodiment, the optical system for yellow has five returning mirrors in total. Among them, two of the returning mirrors in the main scanning direction are the reflecting surface of the rotating polygonal mirror 38 and a reflecting mirror 60. Three of the returning mirrors in the sub-scanning direction are returning mirrors 50 and 52, and a cylindrical mirror 54.

The optical system for magenta has three returning mirrors in total. One of the returning mirrors in the main scanning direction is the reflecting surface of the rotating polygonal mirror 38. Two of the returning mirrors in the sub-scanning direction are returning mirrors 42, and cylindrical mirror 46.

An unillustrated light source 56 for magenta is installed in the embodiment in such a state that the source 56 is rotated about 180° around the optical axis to a light source 56Y for yellow.

The optical system for cyan has four returning mirrors in total. One of the returning mirrors in the main scanning direction is the reflecting surface of the rotating polygonal mirror 38. Three of the returning mirrors in the sub-scanning direction are the returning mirrors 50 and 52, and the cylindrical mirror 54.

The optical system for black has six returning mirrors in total. Two of the returning mirrors in the main scanning direction are the reflecting surface of the rotating polygonal mirror 38 and the reflecting mirror 60. Four of the returning mirrors in the sub-scanning direction are returning mirrors 42 and 44, a cylindrical mirror 46, and a returning mirror 48.

That is, the optical systems for black and cyan according to the second embodiment have the same configuration as those (Refer to FIG. 2) of the optical systems for cyan and black in the first embodiment.

FIGS. 7A through 7D show axial changes of a plurality of optical beams (two dimensional beams) by the returning mirrors according to the second embodiment.

The light source for yellow 56Y and that for cyan 56C are installed in such a state that the source 56Y and 56C are rotated by 180° to those for magenta 56M and for black 56K respectively. The axial directions in the main scanning and the sub-scanning of the optical systems for magenta and black are opposite those of the optical systems for yellow and cyan at the positions of the light sources.

Operation

The operation of the image forming device 80 according to the second embodiment will be explained.

The optical systems for cyan and black according to the second embodiment have the same configuration as those of the optical systems for cyan and black in the first embodiment. Respective optical beam (directions of two dimensional beams) is arranged the same on each of the photosensitive body drums 12 for cyan and black.

Then, the optical systems for yellow and magenta according to the second embodiment are configured as follows. Difference in the total number of the returning mirrors is an even number (5−3=2). The light source for magenta 56M is oriented by rotating 180° with respect to the light source for yellow 56Y. Difference in the number of the returning mirrors in the main scanning direction is set be one or an odd number. Difference in the number of the returning mirrors in the sub-scanning direction is also set to be one or an odd number. Accordingly, all arrangements of each optical beam (directions of two dimensional beams) are the same on each of the photosensitive body drums 12 for yellow and magenta.

The optical beams for yellow and for magenta and the optical beams for cyan and black are emitted in the opposite directions from the rotating polygonal mirrors 38 for deflection and scanning. The directions the coordinate on the photosensitive body drums 12 for each color becomes the same in a state that four colors overlap when the main scanning direction is opposite the sub-scanning direction.

As seen from FIGS. 7A through 7D, each optical beam (directions of two dimensional beams) is allowed to have the same arrangement on each photosensitive body drum 12 for yellow, magenta, cyan and black by applicating the configuration of the second embodiment.

Thus, according to the image forming device 80 of the second embodiment, providing a high speed, high image quality and low-cost image forming device can be achieved as well as the first embodiment.

Other Embodiments

An example in which a plurality of optical beams emitted from a plurality of light sources enter one rotating polygonal mirror 38 has been explained in the above-described embodiments. The present invention is not limited to such an example. The present invention can be applied to a case in which optical scanners with a system where beams emitted from one multi-beam laser enter a rotating polygonal mirror are arranged as disclosed in JP-A No. 63-271275. Some of such optical scanners meet layout-restrictions and requirements for increasing speed and the like. This allows application of the present invention to a case where different optical systems are included.

The number of returning mirrors (in the main scanning direction and in the sub-scanning direction) is not limited to those described in the above embodiments. Obviously, the number can be suitably increased or decreased without departing from the true spirit and scope of the present invention.

As explained above, the image forming device according to the present invention has an advantage that the device can be provided at low cost without making methods for controlling images and the starting position for writing images complicated even when a two-dimensional multi-beam laser is used as a light source.

What is claimed is:

1. An image forming device in which a plurality of multi-beam lasers in which a plurality of light-emitting sections are arranged in two dimensions are arranged; a plurality of photosensitive bodies are arranged corresponding to the multi-beam lasers; latent images are formed on each photosensitive body by scanning a plurality of optical beams emitted from the plurality of multi-beam lasers for exposing the plurality of photosensitive bodies, using optical scanning systems comprising mirrors which return the plurality of optical beams; and a plurality of images formed on each photosensitive body after developing the latent images are overlapped and are output as a single image, wherein the optical scanning systems comprise one or more of the returning mirrors per the multi-beam laser, and directions of the multi-beam lasers and the number of the returning mirrors for each multi-beam laser are set so that each of the photosensitive bodies has the same arrangement, in the main scanning direction and the sub-scanning direction, of a plurality of optical beams emitted from the multi-beam lasers, on the photosensitive bodies.

2. An image forming device according to claim 1, wherein the optical scanning systems comprise a rotating polygonal mirror by which deflection and scanning of the optical beams are executed and the plurality of multi-beam lasers which emit optical beams to be deflected in one direction from an boundary which is assumed to be a virtual line passing through the axis of rotation of the rotating polygonal mirror in the diametral direction are provided, and difference in the number of the returning mirrors between the multi-beam lasers is set to an even number.

3. An image forming device according to claim 1, wherein the optical scanning systems comprise a rotating polygonal mirror which deflects the optical beam for scanning, and include, a multi-beam laser which emits optical beams to be deflected in one direction from an boundary which is assumed to be a virtual line passing through the axis of rotation of the rotating polygonal mirror in the diametral direction and a multi-beam laser which emits optical beams to be deflected in the other direction from the boundary which is assumed to be the virtual line, and difference between the number of the returning mirrors which return the optical beams to one direction from the boundary which is assumed to be the virtual line and the number of the returning mirrors which return the optical beams to the other direction from the boundary which is assumed to be the virtual line is set to be an odd number.

4. An image forming device according to claim 1, comprising an optical scanner which contains the optical scanning systems for black and cyan and an optical scanner which contains the optical scanning systems for magenta and yellow.

5. An image forming device according to claim 1, comprising an optical scanner which contains the optical scanning systems for four colors of yellow, magenta, cyan and black.

6. An image forming device according to claim 2, wherein the optical scanning systems comprise the returning mirrors which return the optical beams in the main scanning direction and the returning mirrors which return the optical beams in the sub-scanning direction, and each of the multi-beam lasers is arranged so that the laser is directed in the same direction about the optical axis when both difference in the number of the returning mirrors which return the optical beams in the main scanning direction between the multi-beam lasers and difference in the number of the returning mirrors which return the optical beams in the sub-scanning direction between the multi-beam lasers are an even number, and one of the multi-beam lasers is arranged so that the laser is rotated by approximately 180° to the other laser about the optical axis when both difference in the number of the returning mirrors which return the optical beams in the sub-scanning direction between the multi-beam lasers and difference in the number of the returning mirrors which return the optical beams in the main scanning direction between the multi-beam lasers are an odd number.

7. An image forming device according to claim 3, wherein the optical scanning systems comprise returning mirrors which return the optical beam in the main scanning direction and returning mirrors which return the optical beam in the sub-scanning direction, each of the multi-beam lasers is arranged so that the laser is directed in the same direction about the optical axis when difference in the number of the returning mirrors which return the optical beams in the main scanning direction between the multi-beam lasers is zero or an even number, and difference in the number of the returning mirrors which return the optical beams in the sub-scanning direction between the multi-beam lasers in an odd number, and one of the multi-beam lasers is arranged so that the laser is rotated by approximately 180° to the other laser about the optical axis when difference in the number of the returning mirrors which return the optical beams in the main scanning direction between the multi-beam lasers is an odd number, and when difference in the number of the returning mirrors which return the optical beams in the sub-scanning direction between the multi-beam lasers in an even number.

8. An image forming device comprising:

four optical scanning systems which are provided with a plurality of light sources including a plurality of light-emitting sections each of which is arranged in two dimensions and with a plurality of mirrors and a plurality of lenses which change paths of optical beams from the light-emitting sections; and four photosensitive body drums corresponding to each of the optical scanning systems, wherein the plurality of mirrors include returning mirrors and the number of the returning mirrors causes a state in which the main scanning directions and the sub-scanning directions of optical beams emitted from the light sources have the same direction on each of the photosensitive body drums.

9. An image forming device according to claim 8, further comprising two optical scanners which contain a set of two optical scanning systems of the fourth optical scanning systems.

10. An image forming device according to claim 8, further comprising one optical scanner which contains all of the four optical scanning systems.

11. An image forming device according to claim 8, further comprising a light quantity detection sensor, wherein the light sources are a surface emitting laser.

12. An image forming device according to claim 9, wherein the plurality of mirrors includes a rotating polygonal mirror which reflects and deflects the optical beams, and difference in the number of the returning mirrors included two optical scanning systems, which are contained in the optical scanners in an even number.

13. An image forming device according to claim 9, wherein the plurality of mirrors in the optical scanning systems comprise main-scanning returning mirrors which return the optical beams in the main scanning direction and sub-scanning returning mirrors which return the optical beams in the sub-scanning direction, and the light sensors in the optical scanning systems are directed in the same direction in one of the optical scanners when both difference in the number of the main-scanning returning mirrors and difference in the number of the sub-scanning returning mirrors between two of the optical scanning systems are an even number.

14. An image forming device according to claim 9, wherein the plurality of mirrors in the optical scanning systems comprise main-scanning returning mirrors which return the optical beams in the main scanning direction and sub-scanning returning mirrors which return the optical beams in the sub-scanning direction, and the light sources in the optical scanning systems are directed in one of the optical scanners in a state such that the light sources make an angle of 180° among them when both difference in the number of the main-scanning returning mirrors and difference in the number of the sub-scanning returning mirrors between two of the optical scanning systems are an odd number.

15. An image forming device according to claim 10, wherein the plurality of mirrors in the optical scanning systems comprise main-scanning returning mirrors which return the optical beams in the main scanning direction and sub-scanning returning mirrors which return the optical beams in the sub-scanning direction, the four optical scanning systems are corresponding to optical systems for yellow, for magenta, for cyan, and for black, difference in the number of the returning mirrors between the optical system for yellow and the optical system for magenta is an even number, the light source in the optical system for magenta is installed in a state such that the source is rotated by 180° about the optical axis of a light source in optical system for yellow, and difference in the number of the main-scanning returning mirrors is an odd number and difference in the number of the sub-scanning mirrors are an odd number.

16. An image forming device according to claim 12, wherein the optical scanners comprise detectors for getting timing for exposing the photosensitive body drums, using the rotating polygonal mirrors.

* * * * *